United States Patent
Brahmajosyula et al.

(10) Patent No.: US 7,577,543 B2
(45) Date of Patent: Aug. 18, 2009

(54) PLUGGED IMPULSE LINE DETECTION

(75) Inventors: Jagadeesh Brahmajosyula, Krishnanagar (IN); Yogananda A. Prabhakara, Bangalore (IN); Lokesh T. Siddaramanna, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 423 days.

(21) Appl. No.: 11/347,933

(22) Filed: Feb. 6, 2006

(65) Prior Publication Data
US 2006/0206288 A1 Sep. 14, 2006

(30) Foreign Application Priority Data
Mar. 11, 2005 (IN) .......................... 158/KOL/2005

(51) Int. Cl.
G01L 13/02 (2006.01)

(52) U.S. Cl. .................... 702/138; 702/6; 702/183; 73/706; 73/707; 73/708; 73/716; 340/611

(58) Field of Classification Search .............. 702/138, 702/16, 183; 340/608, 609, 610, 611, 626; 137/557, 554; 73/706, 707, 708, 3, 4 R, 73/716; 318/616; 381/167, 73.1; 303/122
See application file for complete search history.

(56) References Cited

U.S. PATENT DOCUMENTS

| | | | | |
|---|---|---|---|---|
| 5,680,109 A | * | 10/1997 | Lowe et al. .................. 340/608 |
| 6,654,697 B1 | * | 11/2003 | Eryurek et al. ................. 702/47 |
| 6,813,588 B1 | * | 11/2004 | Daugert et al. ............... 702/183 |
| 6,904,386 B2 | * | 6/2005 | Mylaraswamy .............. 702/183 |
| 6,907,383 B2 | * | 6/2005 | Eryurek et al. ............... 702/183 |
| 7,254,518 B2 | * | 8/2007 | Eryurek et al. ............... 702/183 |
| 7,260,496 B2 | * | 8/2007 | Hashizume et al. .......... 702/138 |
| 2002/0029130 A1 | * | 3/2002 | Eryurek et al. ............... 702/183 |
| 2004/0249583 A1 | * | 12/2004 | Eryurek et al. ................. 702/47 |
| 2005/0097963 A1 | * | 5/2005 | Wilda ........................... 73/716 |
| 2006/0036404 A1 | * | 2/2006 | Wiklund et al. .............. 702/183 |
| 2006/0277000 A1 | * | 12/2006 | Wehrs ......................... 702/183 |
| 2007/0225924 A1 | * | 9/2007 | Hashizume et al. ............ 702/50 |
| 2008/0033693 A1 | * | 2/2008 | Andenna et al. ............. 702/179 |
| 2008/0103629 A1 | * | 5/2008 | Milanovic et al. ........... 700/282 |

OTHER PUBLICATIONS

Amadi-Echendu, J. E., et al., "Identification of Process Plant Signatures Using Flow Measurement Signals", *IEEE Transactions on Instrumentation and Measurement*, 39(2), (1990).

Zhu, H., et al., "Identification of the Transfer Characteristic of a Differential Pressure Transmitter Using Non-Parametric Methods", *Control '94*, Mar. 21-24, 1994, Conference Publication No. 389,681-686.

* cited by examiner

*Primary Examiner*—Carol S Tsai
(74) *Attorney, Agent, or Firm*—Schwegman, Lundberg & Woessner P.A.

(57) ABSTRACT

A digital signal representative of a difference in pressure is received from a differential pressure transmitter. A noise signal is obtained by processing the signal through a band pass filter or otherwise to provide a filtered noise signal. Absolute values of the filtered noise signal are calculated and compared to one or more predetermined threshold values to determine if one or more impulse lines are plugged. A training mode is used to determine the thresholds, which may be a function of flow rate and other flow conditions.

20 Claims, 3 Drawing Sheets

PLUGGED IMPULSE LINE DETECTION

CROSS REFERENCE TO RELATED APPLICATIONS

This application claims priority to India Patent Application No. 158/KOL/2005, filed Mar. 11, 2005, which is incorporated herein by reference.

BACKGROUND

Differential pressure is commonly used for the measurement of pressure, flow and level in industrial processes by measuring a pressure drop near a discontinuity within the pipe. The discontinuity may be in the form of an orifice, nozzle, Venturi, pitot tube, vortex shedding bar, target, or even a simple bend in the pipe. Impulse lines are used to couple a differential pressure sensor to the process on either side of the discontinuity, and provide two pressures (a high pressure, HP, and a low pressure, LP) from different locations in the process, such as on either side of the discontinuity, to a differential pressure transmitter. The differential pressure transmitter measures the difference in pressure between the two impulse lines, and creates and transmits a signal representative of the pressure difference.

Blockage in the impulse lines may occur because dirt or other material in the process may settle in the lines. Typical types of blockages include, for example, solid depositions, wax depositions, hydrate formation, sand plugging, gelling, frozen process fluid plugs and air or foam pockets. Such blockages may lead to erroneous measurement and undesired control actions based on the erroneous measurements. The impact of the erroneous measurements and control actions may result in poor control of the process, and catastrophic results. This can lead to a large loss of revenue, loss of life, and damage to property.

Periodic disassembly and inspection of the impulse lines is one method used to detect and correct plugging of lines. Another known method for detecting plugging is to periodically add a check pulse to the measurement signals from a pressure transmitter. The check pulse causes a control system connected to the transmitter to disturb the flow. If the pressure transmitter fails to accurately sense the flow disturbance, a signal may be generated indicative of plugging.

One prior art system detects plugged impulse lines by subtracting a moving average from a signal and then calculating a variance of the signal. A plugged line is then identified based on a threshold. Such techniques may be undesirable under varying process conditions Other prior methods utilize an absolute pressure signal. Generally, in some other techniques digital output from a differential pressure transmitter is sampled at random intervals and reconstructed into a time varying output that represents the process signal to produce samples. Plugging is detected based on whether variance of such samples exceed a predetermined threshold.

However, all techniques in related art generally focus on plugged impulse line detection. Such a focus may deteriorate the quality of decisions generating false diagnostic information.

Current methods do not address automatic detection of plugged impulse lines under various flow conditions. Under different flow rates with different fluids, false alarms may result, as well as missing actual plugged conditions.

SUMMARY

A digital signal representative of a difference in pressure is received from a differential pressure transmitter. A noise signal is obtained by processing the signal through a band pass filter or otherwise to provide a filtered noise signal. Absolute values of the filtered noise signal are calculated and compared to one or more predetermined threshold values to determine if one or more impulse lines are plugged.

BRIEF DESCRIPTION THE DRAWINGS

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
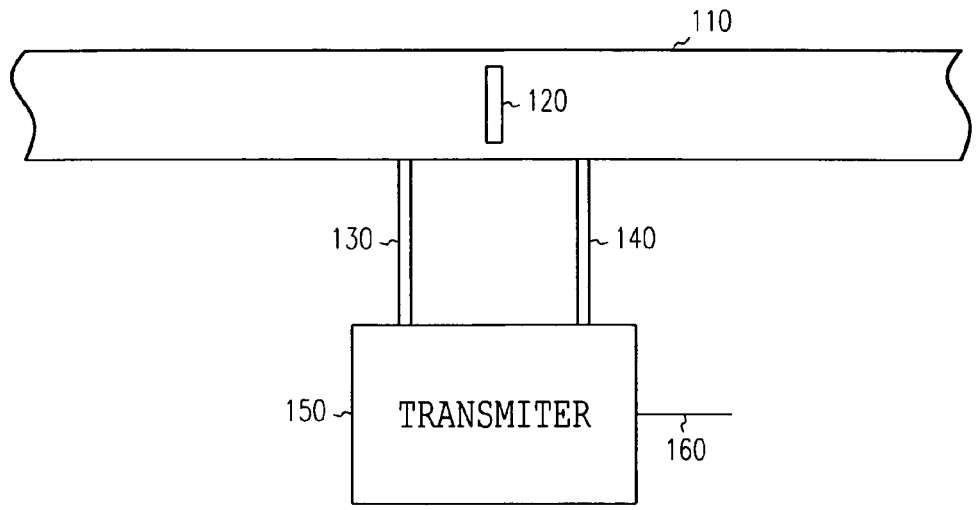
FIG. 1 is a block diagram of a differential pressure transmitter coupled to a process according to an example embodiment.

A differential pressure measurement system 100 in FIG. 1 senses flow through a pipe 110. A discontinuity 120, such as an orifice plate or Venturi tube results in a differential pressure between two points across the discontinuity dependent on flow rate. Impulse lines 130 and 140 are used to connect between these two points and to a differential pressure transmitter 150.

The differential pressure transmitter 150 has a sensor and an electronic body inside, which convents a sensor output representative of the differential pressure into a digital equivalent signal. This digital signal is provided at an output port 160. The differential pressure transmitter 150 can be calibrated and configured for the measurement of flow, pressure and level by connecting it at the terminals of the differential pressure transmitters. Differential pressure transmitter 150 provides the digital equivalents based on the configuration and the process condition.

Figure 2:
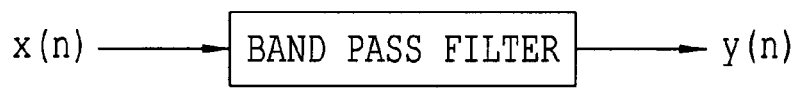
FIG. 2 is a block diagram of a band pass filter according to an example embodiment.

The digital differential pressure signal from the differential pressure transmitter is passed through a filter, such as a band pass or high pass filter as shown in FIG. 2, which retains only certain frequency components of the signals. Such components include a signature of process flow conditions in a middle frequency band. In a training mode, typically a plurality of thresholds are arbitrated based on parameters such as for example a plurality of noise threshold limits and a plurality of cross-over frequencies of an absolute value of the filtered noise signal beyond the noise threshold limit. Such arbitration desirably characterizes plugging diagnostics of the impulse line corresponding to each of a plurality of predetermined diagnostic states pertaining to those impulse lines. In a further embodiment, Threshold arbitration parameters are selected from the group consisting of predetermined confidence limit, variance of data representing process characteristics (e.g. flow rate), and combinations thereof.

Figure 7:
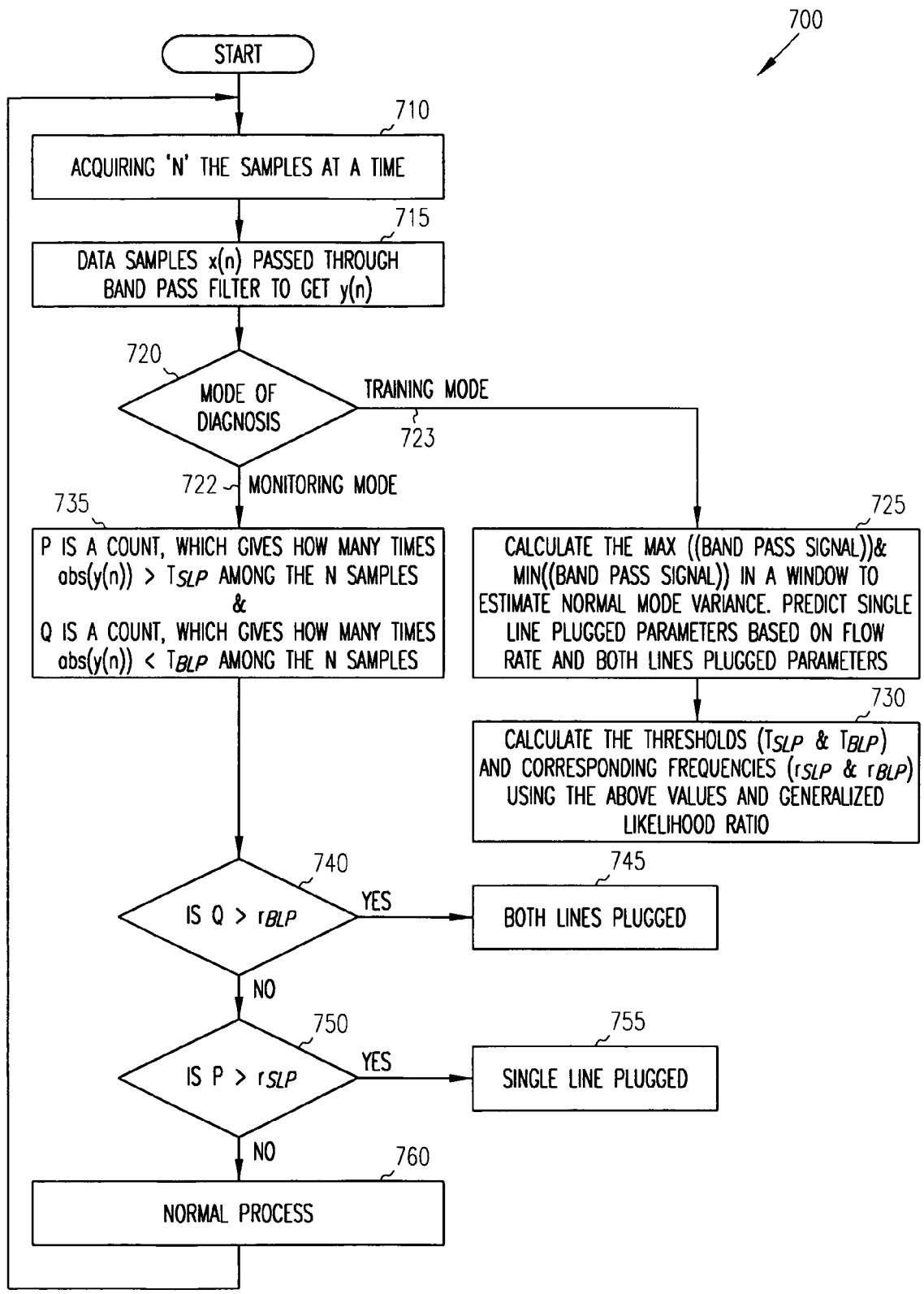
FIG. 7 is a flow chart showing a computer implemented method of diagnosing line plugs.

The number of times the absolute value of the signal crosses a threshold in a window is noted in a monitoring mode. A threshold $T_{SLP}$ and frequency $r_{SLP}$ are computed in a training mode, as illustrated in the flow chart shown in FIG. 7 at 700 and described in further detail below. $T_{SLP}$ is the threshold used to compare the magnitude of the noise signal. $r_{SLP}$ is the minimum number of times the noise signal has to cross the threshold $T_{SLP}$ if single line is plugged. In a monitoring mode, P and Q are found as indicated in FIG. 7. P is the number of times the absolute value of the signal crosses a threshold $T_{SLP}$ in a window of length N. Q is the number of times the absolute value of the signal falls below a threshold $T_{BLP}$ in a window of length N. If Q is greater than $r_{BLP}$, then both impulse lines are plugged. If P is greater than $r_{SLP}$, then one of the impulse lines is plugged. If neither condition is detected, then the impulse lines are normal.

In one embodiment, the above system may be implemented in the differential pressure transmitter, working on data collected. The system continuously monitors the health of the impulse lines, and generates an alarm when one of the lines or both of the lines are plugged.

FIG. 7 illustrates a method implemented by a system generally at 700. The system receives N samples corresponding to a digital representation for window of length "N" at 710. The data is passed through the filter at 715, which selects certain frequency components of the signal and rejects the rest. The pass band frequency ranges of the filter can be varied depending on the process type and sampling rate of the DP Transmitter ($f_s$), but they can also be predetermined to specific range of values. Some values of the pass band in one embodiment are $[0.2f_s\ 0.7f_s]$ and the stop band values are $[0\ 0.1f_s]$ and $[0.9f_s\ f_s]$.

In one embodiment, there is no attenuation in the pass band. In further embodiments, the attenuation in the pass band can be 0.001 db (decibels), and all the components in the stop band are rejected. Thus, a stop band attenuation of 80 db may be used. Butterworth IIR (Infinite Impulse Response) filter coefficients and the order of filter may be calculated for the above specifications i.e., pass band, stop band frequencies and attenuations.

The output of the filter may be termed as the noise, which depicts the characteristics of the process for the plugged impulse line detection. A diagnosis mode is determined at 720. The modes include a monitoring mode indicated by decision branch 722 and a training mode decision branch 723. In the training mode, parameters of the distribution of the noise signal are estimated at 725. Typical parameters estimated are maximum and minimum values of the band pass filtered signal. These two parameters are used to make an estimate of the variance of the noise signal, under normal conditions. The process noise under normal and single line plugged condition vary with respect to the flow rate.

Generalized likelihood ratio (GLR) is employed to calculate the thresholds based on the user-defined confidence limit for false alarm and miss hit probabilities at 730. It can also be configured to provide an optimized solution i.e., for low miss hits and low false alarm. The Generalized likelihood ratio design is as explained below.

Let input time series (typically differential pressure transmitter readings) be x(n), random process as shown in FIG. 2.

y(n) is the output of the band pass filter.

Let w(n) be defined as $$w(n) = \begin{cases} 1 & \text{if } |y(n)| > T_{SLP} \\ 0 & \text{otherwise} \end{cases}$$

Let $$z(n) = \sum_{i=0}^{N-1} w(n-i)$$

Figure 3:
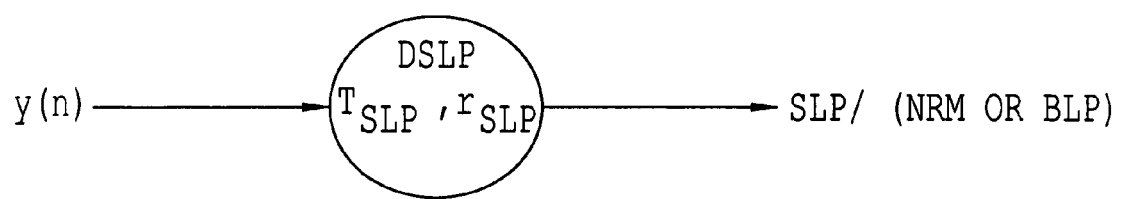
FIG. 3 is a flow diagram of detector for single line plugs according to an example embodiment.

The Single Line Plugged detector is shown in FIG. 3, and basically compared the number of times that y(n) reaches or crosses/exceeds a single line plugged threshold $T_{SLP}$.

Figure 4:
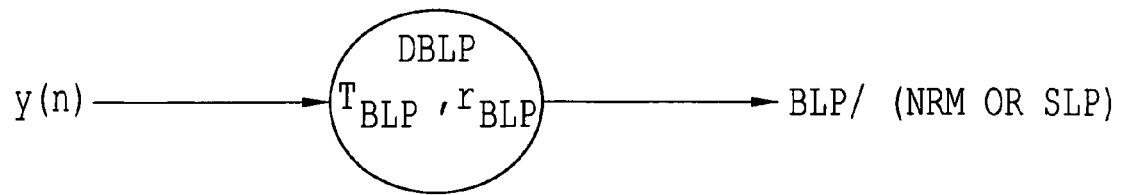
FIG. 4 is a flow diagram of detector for both lines plugged according to an example embodiment.

Assuming a distribution of the noise signal under various states of the impulse lines and under various flow conditions, a classifier between the various states of the impulse lines can be designed that works better than the Bayes classifier which gives a decision based on a single observation. This is possible because the impulse lines tend to remain in a particular state for considerable lengths of time. Observing the noise signal in a long window of time, the state of the impulse lines can be assessed with a high degree of confidence. The skeleton of the decision frame work involves finding a threshold $T_{SLP}$ and a frequency $r_{SLP}$ for detecting single line plugging (SLP) and $T_{BLP}$ and $r_{BLP}$ for detecting Both Lines Plugged condition. The absolute value of the noise signal is compared with the threshold $T_{SLP}$ in a window of length N. If the number of times the absolute value of the noise signal crosses the threshold $T_{SLP}$ is greater than $r_{SLP}$, then the state of the impulse lines is said to be Single Line Plugged (SLP). Refer flow chart for the flow of decisions. If $z(n) \geq r_{SLP}$ then single line is plugged (SLP). Otherwise it is inferred that either the state of the line could be normal (NRM) or both lines are plugged. Another detector for both lines plugged condition is used to decide between both lines plugged (BLP) or otherwise as shown in FIG. 4. This completes the one versus rest classifier, which provides the ability to discriminate among a plurality of diagnostic states.

Figure 5:
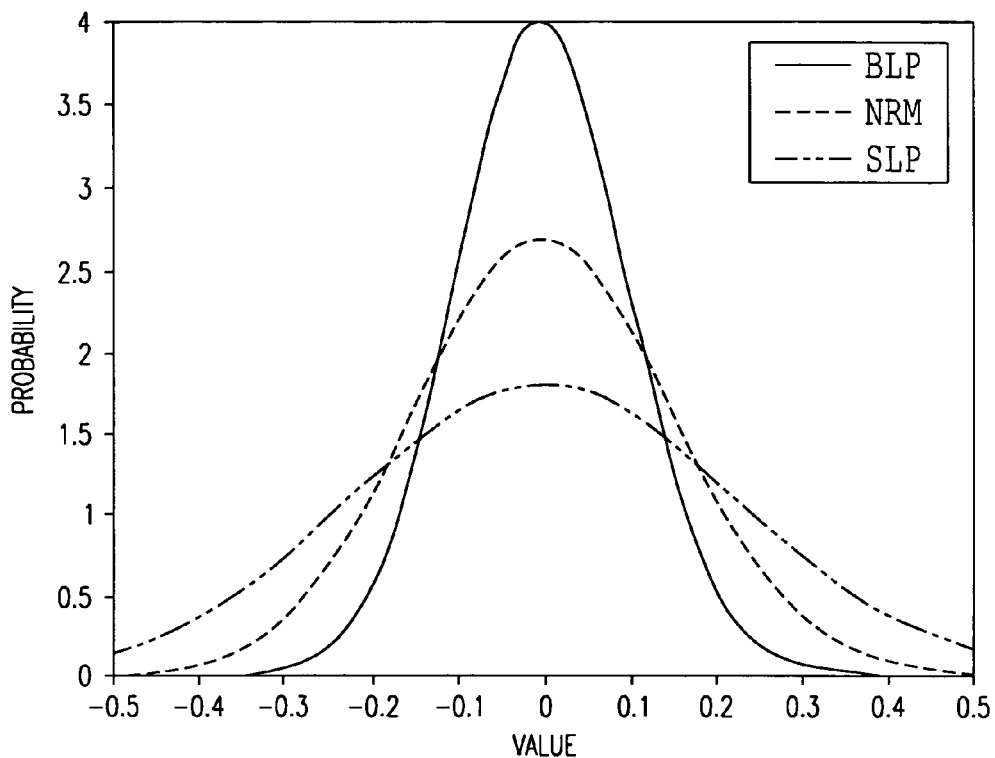
FIG. 5 is a graph showing distributions of values for various conditions according to an example embodiment.

The design is a one versus rest classifier with worst-case assumption. Typically the worst case arises when the variance under BLP is equal to the variance of NRM state in the design of the DSLP classifier, which detects single line plugging. In this situation, we need to design a discriminant between NRM and SLP. Since SLP condition is assumed to be a Gaussian distribution with variance higher than variance of NRM distribution, the SLP variance is much higher than the variance of BLP. If we design a classifier to distinguish between SLP and NRM then it will discriminate between SLP and BLP too. The design for DBLP is similar. If we discriminate between NRM and BLP, we achieve discrimination between BLP and SLP too. The probability distributions are shown in FIG. 5.

Design of DSLP is based on the following as shown in FIG. 3:

False Alarm Probability $(FA) = p(z(n) \geq r_{SLP}|NRM)$

Miss Hit Probability $(MH) = p(z(n) < r_{SLP}|SLP)$

In one embodiment, $T_{SLP}$ and r are found that minimize both FA and MH This may be done by reducing FA and MH below a user specified threshold that is between 0 and 0.5.

Let $$\pi_0 = P(|y(n)| > T_{SLP}|NRM) = 1 - \int_{-T_{SLP}}^{T_{SLP}} e^{-\frac{x^2}{2\sigma_0^2}} dx, \sigma_0$$

is the noise variance in NRM $$p(z(n) \geq r|NRM) = \sum_{k=r}^{N} \binom{N}{k} \pi_0^k (1-\pi_0)^{N-k} \quad \text{(Equation 1)}$$

assuming y(n) is an i.i.d. (independent and identically distributed) Gaussian process.

Let $$\pi_1 = P(|y(n)| > T_{SLP}|SLP) = 1 - \int_{-T_{SLP}}^{T_{SLP}} e^{-\frac{x^2}{2\sigma_1^2}} dx \sigma_1$$

is the noise variance in SLP.

$$p(z(n) < r|SLP) = \sum_{k=0}^{r-1} \binom{N}{k} \pi_1^k (1-\pi_1)^{N-k} \quad \text{(Equation 2)}$$

Figure 6:
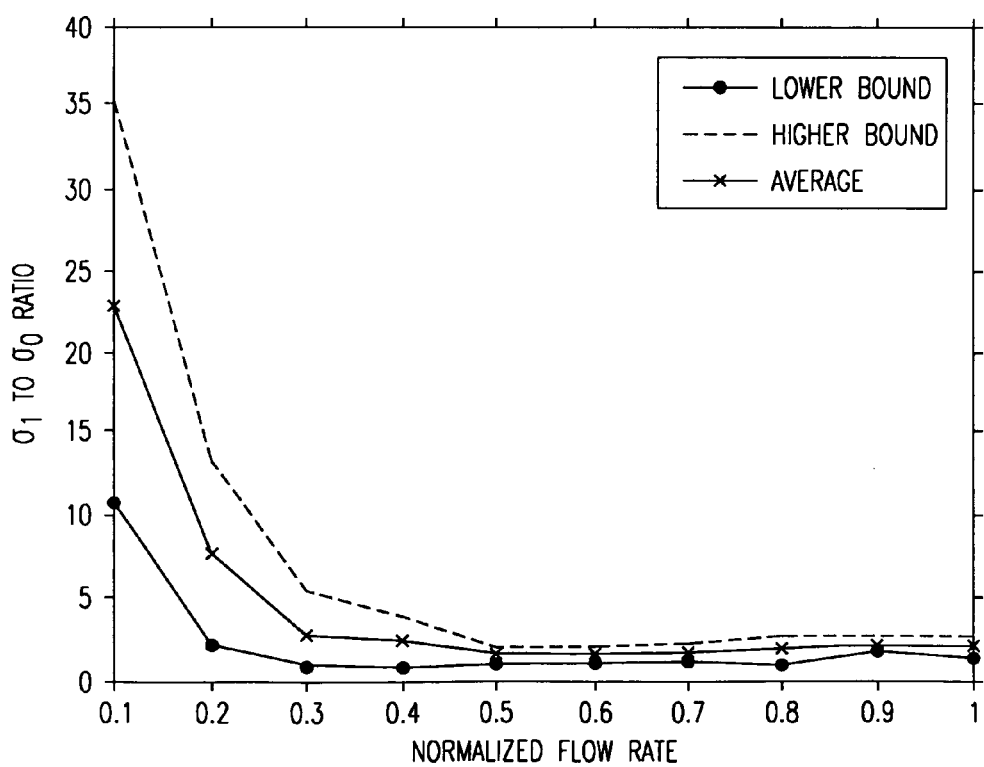
FIG. 6 is a graph showing noise versus flow rate according to an example embodiment.

$\sigma_1$ is a function of $\sigma_0$ and flow rate. This may be seen from the graphs in FIG. 6 relating $$\frac{\sigma_1}{\sigma_0}$$

with flow rate. This curve has been obtained through experimental studies by collecting appropriate data with different differential pressure transmitters and plugging each of the lines separately. If the curve with the lowest $$\frac{\sigma_1}{\sigma_0}$$

ratio for various flow rates (Lower Bound in FIG. 6) is considered for guessing the value of $$\frac{\sigma_1}{\sigma_0}$$

for a particular flow rate then it leads to more false alarms. If the curve with the lowest $$\frac{\sigma_1}{\sigma_0}$$

ratio for various flow rates (Upper Bound in FIG. 6) is considered for guessing the value of $$\frac{\sigma_1}{\sigma_0}$$

for a particular flow rate then it leads to more miss hits. Hence, the average curve is considered for prediction of variance of y(n) under single line plugged state. A piecewise linear curve is made for this curve. Based on this curve, reasonable values for FA and MH need to be provided by the user or must be found automatically. FA and MH cannot be very low when $$\frac{\sigma_1}{\sigma_0}$$

is very close to 1. For $$\frac{\sigma_1}{\sigma_0} = 2.0,$$

FA and MH have been set to 0.001 (this is also the lower bound on FA or MH). For $$\frac{\sigma_1}{\sigma_0} = 1.0063$$

(corresponding flow rate=0.5) FA and MH have both been chosen to be 0.5. For values of $$\frac{\sigma_1}{\sigma_0}$$

between 1.0063 and 2.0, FA and MH are found by linear interpolation of 0.5 and 0.001.

Next, $T_{SLP}$ and $r_{SLP}$ are found that minimize Equations (1) and (2). This may be achieved by running $T_{SLP}$ from $\sigma_0$ to $3\sigma_1$ (the data should not cross this upper threshold in one embodiment), and finding the range of r that minimizes Equations (1) and (2) for each $T_{SLP}$. The final $T_{SLP}$ is chosen from somewhere in the middle of the range in one embodiment. Alternatively $T_{SLP}$ can be chosen as the Bayes optimal threshold and r can be determined from (1) and (2). The Bayes optimal threshold to discriminate between two classes which both have normal distributions ($f_1(x)$ and $f_2(x)$ respectively) is the value of x at which any two Gaussian densities intersect. FIG. 5 illustrates the probability distributions of y(n) under BLP, NRM and SLP. The point of intersection of NRM and SLP distributions can be taken as $T_{SLP}$. Similarly, the point of intersection of NRM and BLP distributions can be taken as $T_{BLP}$.

Design of DBLP is shown in FIG. 4, and basically compares the noise to a double line plugged threshold. When the noise is equal to, or less than the double line plugged threshold, a count is incremented. If the count exceeds $r_{BLP}$, within a non overlapping window of N samples, then the condition of the impulse lines is said to be BLP.

Let w(n) be redefined as $$w(n) = \begin{cases} 1 & \text{if } |y(n)| \leq T_{BLP} \\ 0 & \text{otherwise} \end{cases}$$

Let $$z(n) = \sum_{i=0}^{N-1} w(n-i)$$

Similar definitions of FA and MH hold.

False Alarm Probability $(FA) = p(z(n) \geq r_{BLP} | NRM)$

Miss Hit Probability $(MH) = p(z(n) < r_{BLP} | SLP)$

Let $$\pi_0 = P(|y(n)| \leq T_{BLP} | NRM) = \int_{-T_{BLP}}^{T_{BLP}} e^{-\frac{x^2}{2\sigma_0^2}} dx, \sigma_0$$

is the noise variance in NRM and let $$\pi_1 = P(|y(n)| \leq T_{BLP} | BLP) = \int_{-T_{BLP}}^{T_{BLP}} e^{-\frac{x^2}{2\sigma_1^2}} dx,$$

$\sigma_1$ is the noise variance under BLP. The same equations (1) and (2) hold, under the new definitions of $\pi_0$ and $\pi_1$. Experimental results suggest that putting $\sigma_0 = 1.5 \sigma_1$ is sufficient to detect a both lines plugged case.

It may be noted that GLR is nothing but the ratio of expressions on the LHS of equations (1) and (2).

In the monitoring mode the digital representation of the differential pressure signal of a window length "N" is received at 710. The received signal is again passed through the same band pass filter 715 as explained in the training mode. The filter order and all coefficients remain the same. The filtered noise signal is analyzed for the plugged impulse line detection in the monitoring mode branch 722.

From the noise signal data obtained from the window, the absolute value (AV) of the signal is calculated. The absolute value is checked how many times it has crossed the value $T_{SLP}$ at 735. P is a count used to represent that amount. If it has crossed more than $r_{SLP}$ times in the SLP calculations as indicated at 750, then an alarm is generated at 755 indicating single line has plugged.

Q is a count which gives how many times AV is falling less than $T_{BLP}$ at 735. If AV is falling less than $T_{BLP}$ at 740 for $r_{BLP}$ number of times in a window length of "N" for the filtered noise signal, then an alarm is generated at 745 indicating that both lines are plugged. The value of r is different for single line plugging detection and both lines plugged detection.

If neither condition is satisfied, then the monitoring mode operation may be repeated on a periodic basis as indicated at 760.

CONCLUSION

A differential pressure signal from a differential pressure transmitter is passed through a filter, which removes mean variations of the signal and retains only certain frequency components of the signals. Other means of obtaining such components may be used. Such components include a signature of process flow conditions in a middle frequency band. In a training mode, different thresholds are set for different flow conditions based on a detection confidence limit and flow rate. The number of times the absolute value of the signal crosses different thresholds in a window is noted in a monitoring mode. This is compared with trained values. If this is higher than the trained value, then one of the lines of the differential pressure transmitter is plugged. If the number of times the absolute value of signal falls below another threshold is higher than a frequency calculated in training mode, then both of the impulse lines are plugged.

In one embodiment, the above algorithm may be implemented in the differential pressure transmitter, working on data collected. The algorithm continuously monitors the health of the impulse lines, and generates an alarm when one of the lines or both of the lines are plugged.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method to diagnose plugging of at least one impulse line carrying a process fluid therethrough; said method comprising:
    receiving a digital signal from a differential pressure transmitter representative of pressure differential across at least two points of said impulse line;
    processing the signal through a filter to provide a filtered noise signal;
    calculating an absolute value of the filtered noise signal;
    arbitrating a plurality of noise threshold limit and a plurality of cross-over frequency of said absolute value of the filtered noise signal beyond said noise threshold limit to characterize plugging diagnostics of the impulse line corresponding to each of a plurality of predetermined diagnostic states pertaining to said impulse lines;
    comparing the absolute value of the filtered noise signal relative to said arbitrated noise threshold limit to obtain plugging diagnostics information; and
    discriminating among said plurality of diagnostic states as a function of said plugging diagnostic information.

2. The method of claim 1 wherein said diagnostic state comprises representing at least one of a single impulse line plugged or dual impulse line plugged or unplugged impulse line.

3. The method of claim 2 wherein the diagnostic state represents single impulse line plugging when the absolute value of the filtered noise signal exceeds the noise threshold limit corresponding to said single impulse line plugged by at least the cross-over frequency corresponding thereto.

4. The method of claim 2 wherein the diagnostic state represents at least one of dual impulse line plugged or unplugged impulse line when the absolute value of the filtered noise signal is less than the noise threshold limit corresponding to the single impulse line plugged by at least the cross-over frequency corresponding thereto.

5. The method of claim 4 wherein the diagnostic state represents dual impulse line plugged when the absolute value of the noise signal is less than the noise threshold limit corresponding to said dual impulse line plugged by at least the cross-over frequency corresponding thereto.

6. The method of claim 4 wherein diagnostic state represents unplugged impulse line when the absolute value of the noise signal is less than the noise threshold limit corresponding to the dual impulse line plugged by less than the cross-over frequency corresponding thereto.

7. The method of claim 1 wherein said arbitrating is based on a plurality of threshold arbitration parameters selected from the group consisting of predetermined confidence limit, variance of data representing process characteristics and combinations thereof.

8. The method of claim 1 wherein the received digital signal is representative of the difference in pressure during a selected window of time.

9. The method of claim 8 wherein the absolute value of the filtered noise signal varies during the selected window of time.

10. A machine readable medium having instructions stored thereon for causing a machine to execute a method comprising:
receiving a digital signal representative of a difference in pressure from a differential pressure transmitter;
processing the signal through a band pass filter to provide a filtered noise signal;
calculating an absolute value of the filtered noise signal; and
counting the number of times that the absolute value of the filtered noise signal exceeds a predetermined threshold value to determine if an impulse line is plugged.

11. A method comprising:
receiving digital data from a differential pressure transmitter;
filtering out a required band of signals and retaining a desired frequency band signal;
calculating thresholds based on user confidence limits for detection and false alarms;
calculating thresholds based on flow rate variances;
calculating thresholds based on different process fluid and process conditions;
detecting a plugged impulse line or lines based on the threshold calculated and comparing with the filtered signal; and
alarming the condition of the impulse lines with the confidence limits.

12. A method comprising:
detecting a difference in pressure via impulse lines coupled to a process being monitored;
filtering the detected pressure difference to obtain a noise signal;
converting the noise signal to absolute values;
comparing the absolute values to predetermined thresholds; and
counting the number of times the absolute values exceed predetermined thresholds to determine whether one or both impulse lines are plugged.

13. The method of claim 12 wherein counting is done during a selected window of time.

14. The method of claim 12 wherein an impulse line is plugged if the absolute value crosses a predetermined threshold, $T_{SLP}$, (threshold of single line plugged) more than a predetermined number of times during the selected window of time.

15. The method of claim 12 wherein two impulse lines are plugged if the absolute value falls below a $T_{BLP}$ (threshold of both lines plugged) a predetermined number of times during the selected window of time.

16. A system comprising:
a differential pressure transmitter for coupling to impulse lines to sense a difference in pressure in a process; and
means for discriminating among a plurality of diagnostic states pertaining to said impulse lines as a function of plugging diagnostics information, said diagnostics information being determined as a function of noise, said means comprising:
an analog to digital converter that converts sensed pressure to a digital representation;
a band pass filter that provides a noise signal from the digital representation; and
a detector that counts a number of times an absolute value of the noise signal reaches a predetermined threshold.

17. The system of claim 16 wherein the detector counts threshold crossings for a single line blocked threshold and a double line blocked threshold.

18. The system of claim 17 wherein the single line blocked threshold is higher than the double line blocked threshold.

19. The system of claim 17 wherein the difference in pressure is representative of a flow rate, and the thresholds are set for different flow conditions based on a desired detection confidence limit and flow rate.

20. The system of claim 16 wherein the detection confidence limit is a function of minimizing miss hit probability and false alarm probability.

* * * * *